United States Patent [19]

Sorg et al.

[11] Patent Number: 4,836,841
[45] Date of Patent: Jun. 6, 1989

[54] ROOF FOR THE WORKING AREA, MELTING AREA OR GOB FEEDER OF A GLASS MELTING FURNACE

[75] Inventors: Helmut Sorg, Johannesberg; Matjaz Bucar, Karsbach, both of Fed. Rep. of Germany

[73] Assignee: Sorg GmbH & Co. KG, Lohr/Main, Fed. Rep. of Germany

[21] Appl. No.: 43,872

[22] Filed: Apr. 29, 1987

[30] Foreign Application Priority Data

May 6, 1986 [DE] Fed. Rep. of Germany ....... 3615276
Apr. 6, 1987 [DE] Fed. Rep. of Germany ....... 3711045

[51] Int. Cl.⁴ .............................................. C03B 5/44
[52] U.S. Cl. ...................................... 65/347; 65/336; 65/346; 110/331; 110/332; 432/247; 432/250
[58] Field of Search ................. 65/336, 340, 345, 346, 65/347, 72; 432/247, 249, 250; 110/331, 332

[56] References Cited

U.S. PATENT DOCUMENTS

| 1,339,615 | 5/1920 | Wundrack | 110/332 |
| 1,949,380 | 2/1934 | Soubier | 65/347 |
| 3,201,219 | 8/1985 | Frazier et al. | 65/347 |
| 3,248,203 | 4/1966 | Cunningham | 65/347 |
| 4,539,919 | 9/1985 | Bossetti | 110/331 |
| 4,622,059 | 11/1986 | Brown | 65/346 |
| 4,704,155 | 11/1987 | Matesa et al. | 65/347 |

FOREIGN PATENT DOCUMENTS

| 1015976 | 9/1957 | Fed. Rep. of Germany . |
| 1130116 | 5/1962 | Fed. Rep. of Germany ........ 65/347 |
| 1317242 | 6/1963 | France ................................. 65/347 |

Primary Examiner—Arthur Kellogg
Attorney, Agent, or Firm—Felfe & Lynch

[57] ABSTRACT

Roof of a working tank or of a glass melting furnace having a basin containing molten glass and covered by the radiation roof of highly refractory firebrick material, in which the roof is constructed with horizontal supporting elements in the form of straight arches (3) bearing the load of the roof (1) and spanning the tank at intervals, and with horizontal slabs (4) covering the open intervals between the supporting elements (3) and laid crosswise between the supporting elements (3).

17 Claims, 6 Drawing Sheets

ROOF FOR THE WORKING AREA, MELTING AREA OR GOB FEEDER OF A GLASS MELTING FURNACE

BACKGROUND OF THE INVENTION

The invention relates to a roof for the melting area or working area, or fining end or the like, of a glass melting furnace (tank) made of refractory material.

In a glass melting furnace it is common practice to connect to the actual melting tank output a working tank having a feeder which contains molten glass in mass flow. The roof of the melting and working tank is usually formed by an arch.

The working tank serves mainly for feeding the glass coming from the throat into the feeder or feeders. The purpose of the latter is to bring the glass, by heating or cooling it, to the working temperature, which differs according to the product. This has not, however, been possible, especially to the degree desired combined with uniformity of temperature throughout the mass, if the feeders are very short, for example, or the glass comes from the throat at too high a temperature, for example, or if there are frequent changes of load.

For these reasons it is desirable to precondition the glass in the working tank, so that the glass, when it enters the feeder or feeders, will be brought to a temperature that is as close as possible to the desired gob temperature, while preserving homogeneity.

Working tanks are known in which such preconditioning is performed. These are working tanks which are disposed in the form of a feeder channel that runs usually across the long axis of the furnace. To heat and cool the glass and to cover the channel, systems similar to those commonly used on gob feeders are used.

Usually, however, working tanks are constructed in any desired ground plan, the size of which often amounts to about 10 to 20% of the melting tank area and whose shape is determined by the arrangement of the machines, i.e., it is irregular.

Such working tanks usually have an undivided combustion chamber, a distance between the glass bath surface and the arch or dome of more than 50 cm, and can usually have only an overall temperature control. The installation of stirrers or thermocouples is very difficult on account of the great distance between the glass bath and the arch.

The construction of the furnace superstructure is very complex, since the arch can be made only from relatively small-size bricks.

An efficient control of the parameters of the state of the molten glass from the roof has been neither customary nor feasible heretofore. This also is true of the actual melting tank. It was therefore possible that, in spite of all experience on the part of the operators and all manipulation of the means for temperature control, the state of the glass melt, which can be determined only in the area of the gob feeder, might not always be optimal.

The invention is addressed to the problem of designing a substantially improved form of a working tank and feeder on a glass melting furnace having a tank covered by a radiation roof made of highly refractory glass furnace brick material and containing molten glass in mass flow, and having at least one gob feeder disposed on the tank, in order thereby to exercise adjustment and control over the necessary and anticipated parameters of the state of the molten glass in a continuous manner along the path over which it flows from the melting tank through the fining end to the gob feeders. For this purpose the configuration of the working tank and especially of the radiation roof is to be uncomplicated, permit access to the molten glass without difficulty at different points for inspection and testing, and permit the use of means for controlling the temperature. It is also to be possible to place temperature and/or viscosity measuring apparatus at an especially appropriate point on the fining end, and to bring into contact with the glass melt, at a suitable point, heating or cooling elements as well as means for controlling convection, such as stirrers or damming elements.

SUMMARY OF THE INVENTION

The solution of the stated problem is achieved in a working tank of a glass melting furnace having a tank covered by a radiation roof of highly refractory furnace brick material and containing molten glass in mass flow, with a configuration according to the invention in which the roof is constructed with horizontal supporting elements spanning the working tank at intervals and bearing the load of the roof, and with horizontal slabs laid transversely between the supporting elements and covering the open intervals between the supporting elements.

It is furthermore an object of the invention to create straight arches in the form of transportable units, which will no longer need any adjustment during fire-up, and which are also easy to repair, while above the superstructure of a furnace or furnace section there are no longer to be any structural parts which will interfere with the installation of cooling means, heating means, temperature measuring means or stirrers and the like, so that it will be possible for the operator of a furnace to perform repairs independently.

Owing to the fact that the burden of the roof is not supported by a continuous vault or dome, but that for this purpose it has horizontal supporting elements spanning the working tank at intervals and bearing the load of the roof, horizontal slabs being present which fill the open intervals between the supporting elements and are laid transversely between the supporting elements, the surface of the glass melt is made very easily accessible from above the roof.

At the same time a very advantageous and economical construction of the roof is achieved by the fact that the individual bricks used both for the supporting elements and for the slabs are made, in shape and dimensions, as modules of a set or family of brick elements.

The possibility is thus created, to great advantage, for designing and computing these individual bricks for a particular size and configuration of a working tank by the known method of computer aided design (CAD). Not only is it possible in this manner to reduce the great cost of design, but also—and often substantially more important for estimating and construction—to reduce to a minimum the amount of time originally required for this purpose.

Furthermore, the multiplicity of the types of bricks required with different shapes and dimensions is thus reduced to the theoretically reasonable minimum, resulting also in a drastic reduction of costs and manufacturing time, and the production of a working tank and gob feeder becomes considerably more economical.

Advantageously, an embodiment of the invention provides that the roof elements modularly assembled to form the roof of the working tank are disposed at a clear vertical distance from the surface of the melt of between 150 mm and 500 mm, so as to form a flat roof extending horizontally without any arching of the roof.

In an embodiment important to the invention, provision is made for constructing and disposing the supporting elements as straight arches lying on the walls of the basin forming the tank. This configuration of the supporting elements as straight arches constitutes the basic requirement for the unarched, flat roof at a comparatively short distance of between 150 and 500 mm from the surface of the melt.

Directly connected with this roof construction important to the invention is another measure important to the invention, which is characterized in that the slabs laid between the straight arches can be made with openings from which covers can be removed. By such partial openings in the roof, whose cross section can easily be variable, it is possible, for example, to produce a loss of heat from the melt by radiation, and thus a partial temperature reduction can be achieved. In the case of a tank roof as formerly constructed in the form of a dome such a possibility did not exist, on the one hand, and on the other hand, on account of the correspondingly greater distance between the roof arch and the glass melt it did not achieve the same result. Furthermore, the removable-covered openings at different points over the working tank permit an uncomplicated checking of the parameters of the condition of the glass melt on its course from the melting furnace to the gob feeders, and the use of condition-influencing means for local heating or cooling, production of stirring movement or controlling the direction of the flow of the molten glass, and the like.

Such surprising advantages are the cooperative result of the flat and low radiation roof above the working tank and the breakdown of its design into load-bearing elements in the form of straight arches and, on the one hand, and on the other hand the straight slabs placed between them, with the possibility for providing openings with removable covers at various points in the roof.

Another advantage of the invention consists in the fact that it can be applied to any tank shape so that, for example in the case of furnace repair, the flat roof can be installed on it without changing the ground plan of the tank and without appreciably modifying the existing tank anchoring.

Between the straight arches in the form of transportable and self-supporting elements, beams standing on edge can be disposed as intermediate supports between the straight arches, to avoid having excessively large slabs.

Straight arches of the conventional kind have the disadvantage that, under stress, they have a tendency to creep upwardly; the means according to the invention have the purpose of keeping the straight arches vertically in alignment and at the same time of preserving the alignment laterally. The invention therefore for the first time makes it possible to use straight arches on a decisive scale as elements of construction, since they can be made as transportable units and thus they do not have to be made on-site, and constant vigilance during fire-up is no longer necessary, but at the same time long-lasting serviceability is assured.

Additional desirable embodiments of the invention are provided in accordance with the features of the subordinate claims.

BRIEF DESCRIPTION OF THE DRAWING

The invention is shown diagrammatically in a preferred embodiment, and additional advantageous details of the invention can be seen in the drawings. The drawings show in particular.

DESCRIPTION OF THE PREFERRED EMBODIMENT

In a working tank 2 with gob feeders 30 and 30', on a glass melting furnace with a basin 7 covered by a radiation roof 1 of highly refractory furnace construction material and containing continuously flowing molten glass at 29, and having at least one gob feeder 30 disposed thereon, the configuration of the roof that is pertinent to the invention consists in the fact that the roof is formed of the horizontal supporting elements 3 spanning the working tank 2 at intervals A, B and C, and bearing the load of the roof 1 and the horizontal slabs 4 covering the open intervals A, B and C between the supporting elements 3 and laid transversely between the supporting elements 3.

Surprisingly, it is possible with the division of the elements of construction of the radiation roof according to the invention into load-bearing horizontal supporting elements 3 and the slabs 4 covering the intervals, to construct a load-bearing, flat radiation roof of comparatively light construction.

Quite especially, this roof system is suitable so that the individual bricks used for the supporting elements 3 and for the slabs 4 are, as regards their shape and dimensions, formed as modules of a set or family of bricks. The method of construction with elements formed and assembled as modules results in the possibility, as an additional advantage, and as previously mentioned, of producing the design by CAD (computer-aided design), resulting in considerable advantages as regards the complexity of the design, the time required for the design, and the reduction of the manufacturing costs by the use of standardized or modularized individual elements.

Figure 1:
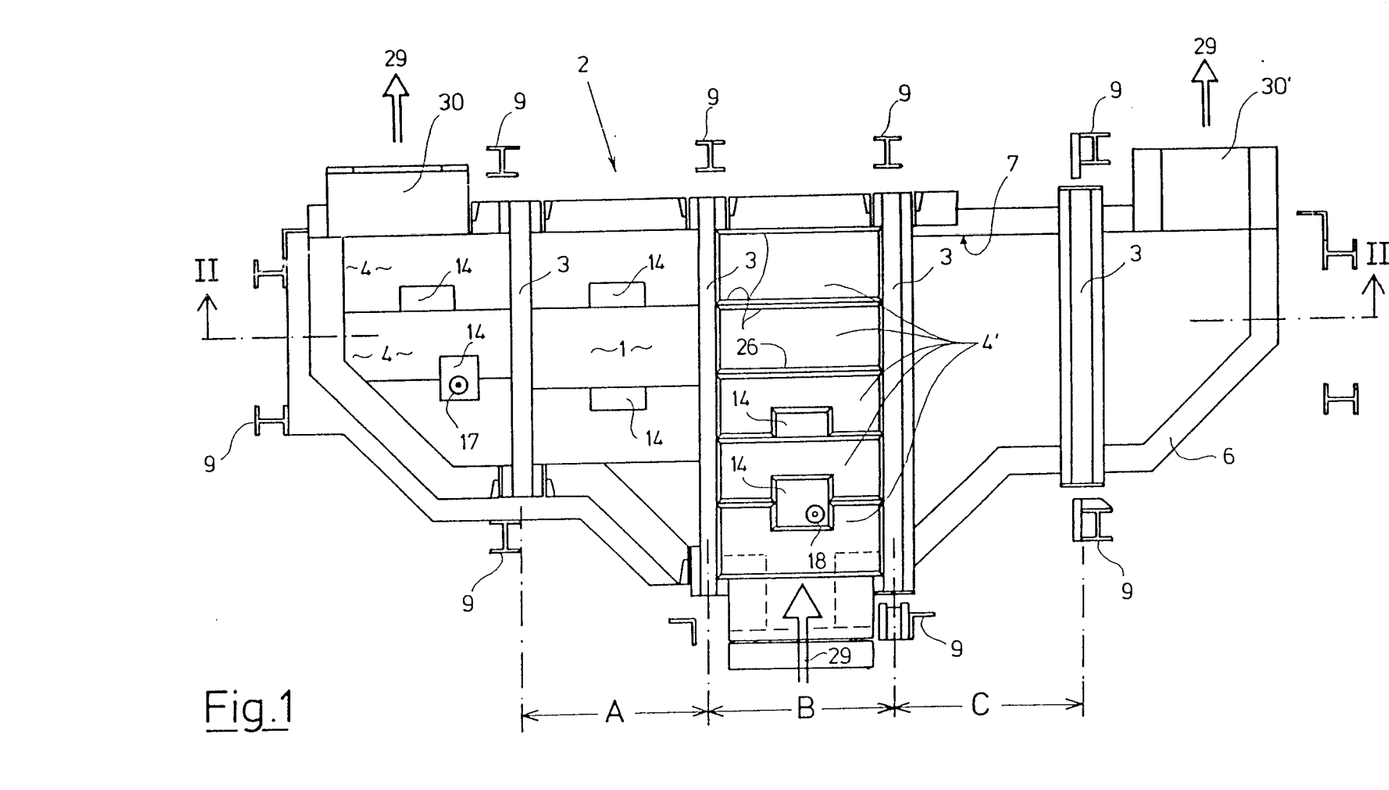
FIG. 1 a top view of a working tank with two gob feeders.
Figure 2:
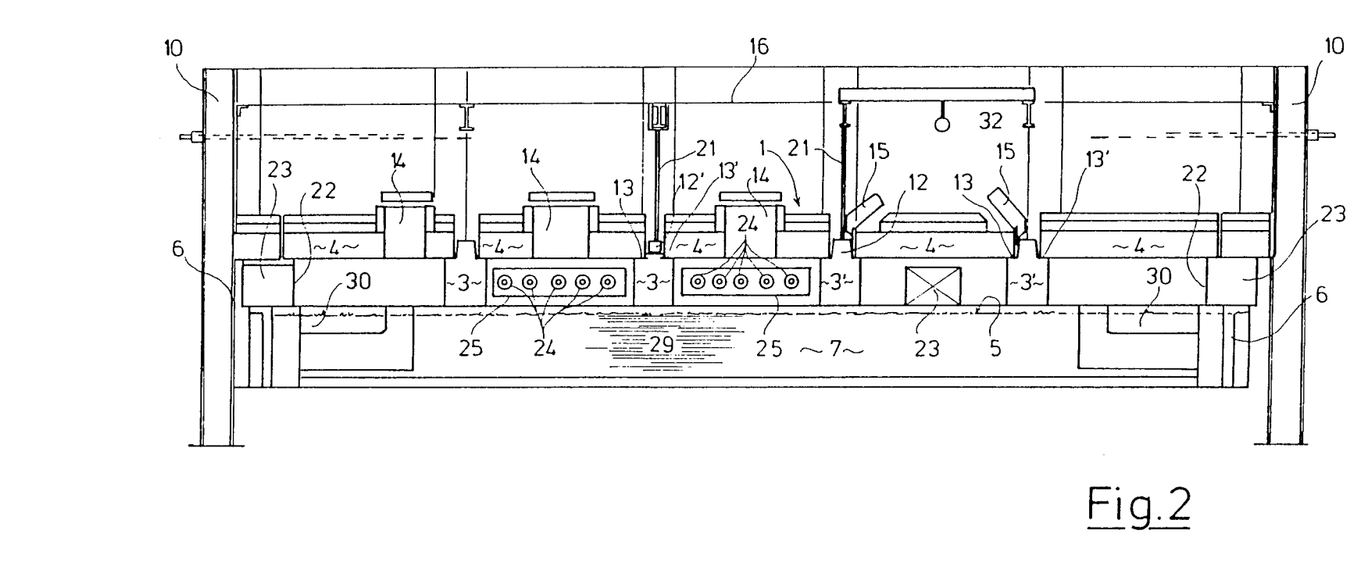
FIG. 2 a cross section taken along the plane II—II through the working tank according to FIG. 1, FIG. 3 a top view of a working tank in another configuration, with four gob feeders, FIG. 4 a side view of a straight arch, FIG. 5 a side view, partially in section, of a straight arch, FIG. 6 a side view of a straight arch with a cross support, FIG. 7 a cross section through the subject matter of FIG. 6, and FIG. 8 a detail of the thrusting part of the crossbeam side supports.
Figure 4:
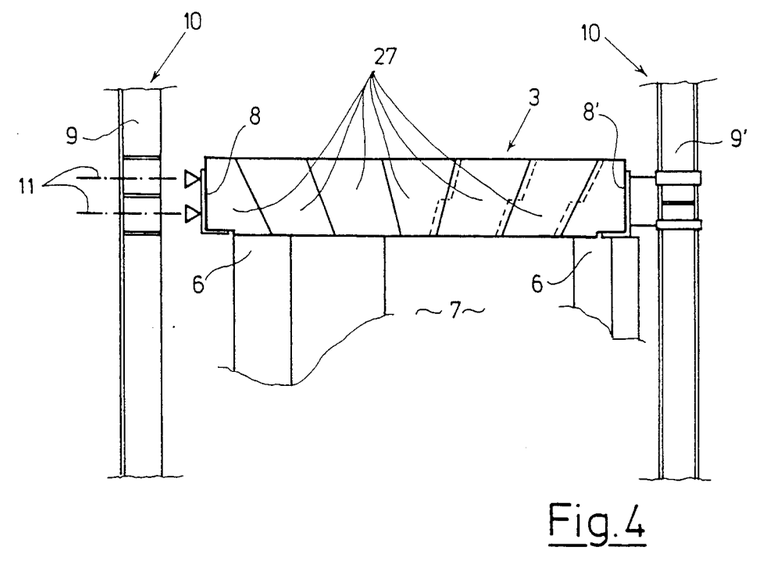

As it will appear from an inspection of the plan view of FIG. 1 and the cross section given in FIG. 2, the roof elements 3 and 4 assembled modularly to form the roof 1 of the working tank 2 are disposed each so as to extend horizontally to form a flat roof without any arching, at a vertical distance of between 75 mm and 700 mm away from the surface 5 of the melt 29. As it can furthermore be seen in FIG. 4, the supporting elements 3 are configured and disposed each in the form of straight arches supported on the walls 6 of the basin 7 forming the tank 2.

Figure 5:
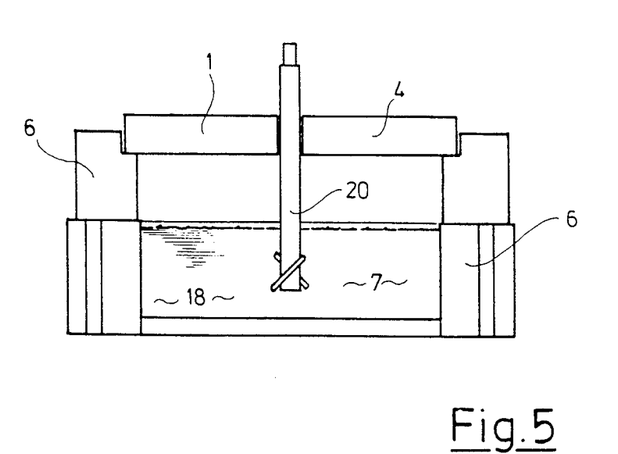

The straight arches are given their self-supporting ability by the fact that they are gripped with horizontal end thrust between end brackets 8 and 8' on the supporting beams 9, 9' of the furnace frame 10. The brackets 8 and 8' have means for the adjustment of the horizontal thrust, preferably screws, as is indicated symbolically by arrows in FIG. 4 and 5.

Figure 3:
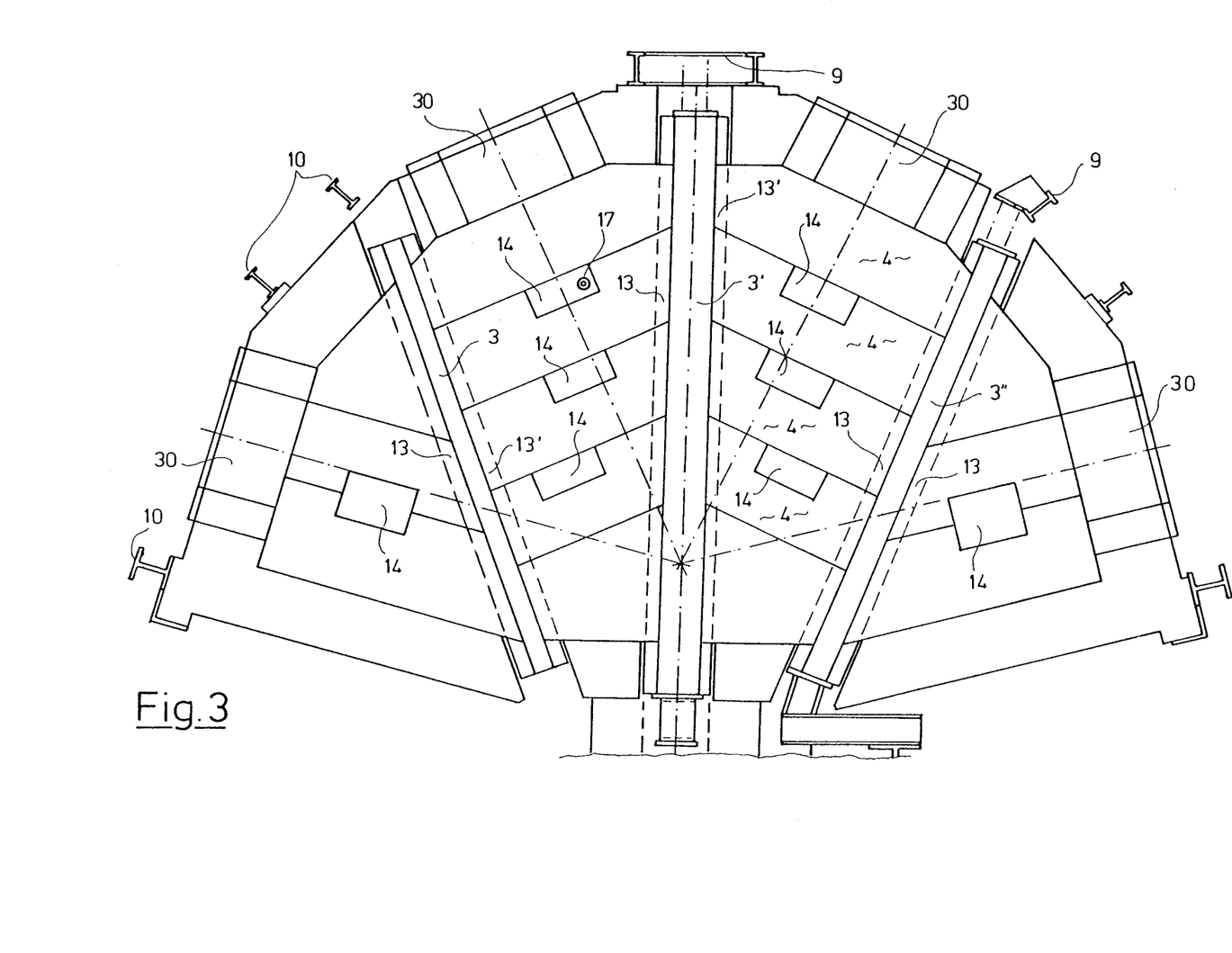

It can furthermore be seen in FIGS. 2 and 3 that the straight arches 3, 3', 3" are formed with rabbeted arrises 13, 13', and the slabs 4 are laid loosely in these rabbets.

With the configuration according to the invention of the radiation roof over the working tank, the result is an especially effective construction—and thus one that is important to the invention—of the slabs 4, by the fact that the latter are displaceable in a direction parallel to the longitudinal axis of the arches (FIG. 1) and especially due to the fact that the slabs 4 are constructed with openings 14 from which covers can be removed.

As it will be seen quite clearly from considering FIGS. 1 and 3, these openings can be distributed in large numbers over virtually the entire area of the radiation roof. They thus make it possible to establish partial temperature reductions in the melt as a result of radiation loss through the uncovered openings, to measure conditions in the melt such as temperature and viscosity by the introduction of suitable measuring instruments, or, by the introduction of known heating or cooling elements, to appreciably control the state of the melt passing through the working tank. Another advantage results from the fact that stirrers can also be inserted into select parts of the melt to contribute to the homogenization of the molten mass by producing a local convection system with a turnover of the bath. Such a stirrer is represented merely by way of example in FIG. 5.

Furthermore, as a consequence of the system of construction of the radiation roof 1 according to the invention, it is possible to make slabs 4, as shown in FIG. 2, so as to be displaceable by movable holding means 15. Such a holding means can include, for example, a grab running on an over-head rail 32. Thus it is possible, for example, when the temperature of the melt is to be lowered in a particular area, to remove one or more slabs 4 temporarily out of its place and set it aside. It is especially helpful and advantageous that, in conjunction with the flat roof construction according to the invention, there is disposed above the flat roof 1 a bridge 16 horizontally spanning the flat roof and supported on columns on the lateral frame 10 of the furnace, on which workmen can walk and perform tasks.

As it can furthermore be seen by comparing FIG. 2 with FIGS. 1 and 3, the bridge coupled with the chief features of the flat radiation roof, and the easy accessibility of the melt surface 5 through the openings 14, make it very advantageously possible and easy to use measuring apparatus 17, for example for measuring temperature and/or viscosity of the glass melt 18 and to use heating or cooling means, stirrers 20 and/or other such means for the examination and/or control of the state of the glass melt. Such means are indicated diagrammatically in FIG. 1.

Lastly, for the heating of the glass melt, provision is made for the installation of burners 23 or racks 25 bearing burner batteries 24 under the flat roof 1, preferably in the corner area 22 between roof 1 and wall 6 of the basin 7.

As a result of the differences in the stress on the construction elements 3 and 4 of the radiation roof 1, the latter are made from different refractory materials. Preferably the slabs 4 are made of a high-alumina refractory material such as sillimanite. Also, these slabs 4', as represented in the center of FIG. 1, are made with relieved, especially chamfered, rounded, or otherwise shaped edges 26. This successfully avoids the danger of the breaking away of brick at these edges of particles which might contaminate the glass melt.

It is furthermore advantageously provided that the bricks 27 of the straight arches are made of refractory material with a very high silica content, such as silica brick.

The construction according to the invention of a working tank for a glass melting furnace with feeders is extremely effective and simple. As a result of this configuration it becomes possible to build glass furnaces economically and to provide ample facilities for the control of the parameters of the molten glass. To this extent it can be said that it provides an ideal solution to the problem stated above.

Figure 6:
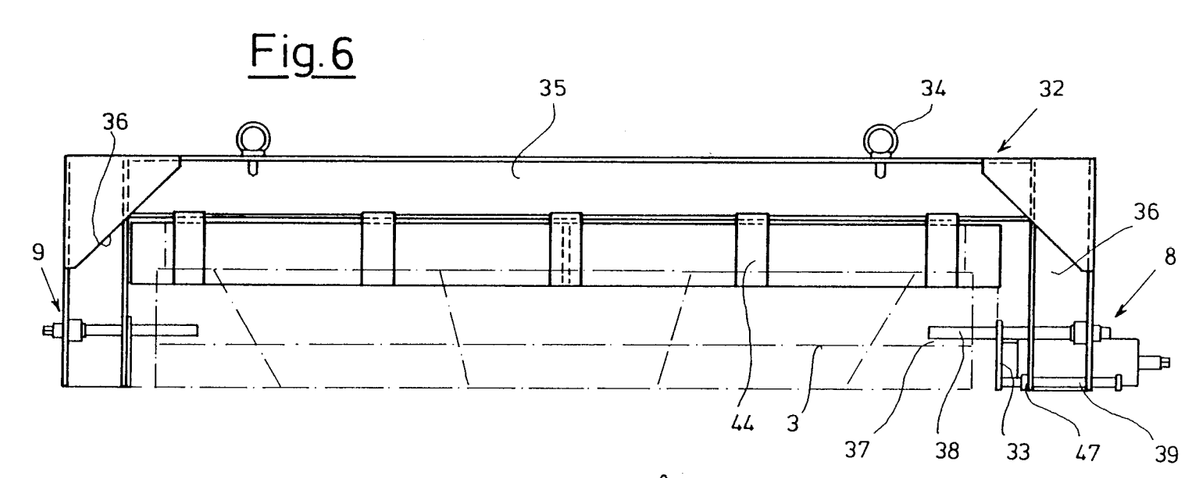
Figure 7:
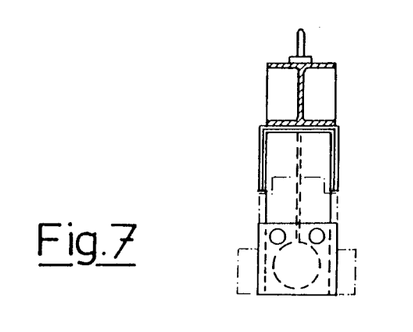
Figure 8:
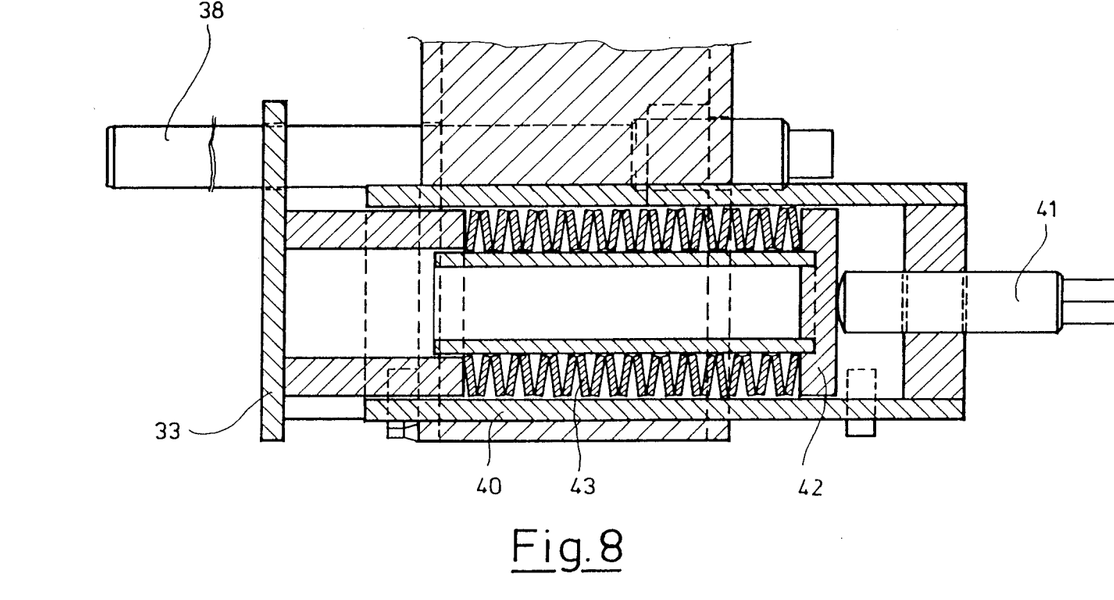

According to FIGS. 6 to 8, the invention also consists in the fact that a straight arch 3 of bricks of refractory materials such as those which have long been known, is made up by means of a frame 32, not simply as a transportable unit, but in that it also avoids the former disadvantages of needing to be given special attention while the furnace is being fired up, as well as during operation.

The straight arch 3 is held by a frame 32 consisting of a beam 35 and a downwardly extending leg 36 at each end, which can compensate for expansions of length during the heating by means of sets of springs 43.

The springs 43, which can be in the form of plate springs, for example, are disposed in a hollow cylinder 40 and are biased by a pressure plate 42 which is held in position by means of a threaded spindle 41.

The force of the spring set 43 acts on a pressure plate 33 which engages the ends of the straight arch 3. The expansion of the springs assures that, while the furnace is being fired up, the holding power of the arch 3 will be maintained, while on the other hand its expansion can be compensated. To prevent the straight arch from collapsing due to fatiguing of the material of the springs 43, the pressure plates 33 are locked up by means of the threaded spindles 39 after the system is up to temperature; the head room of these spindles is such that they can move freely in the direction of pressure application, so that in case of a loss of temperature they will not interfere with the displacement of the pressure plate 33 by the set of springs. The lock nut 47 engaging the end legs 36 urges the spindle 39 against the refractory material of the arch 3 without allowing the other end of spindle 39 to interfere with movement to maintain the tension on the arch 3.

To configure the straight arch as a transportable unit, the upper beam 35 has hoisting eyes 34 and the arch is hung on pins 38 which enter into bores 37 in the refractory material and are held by the legs 36.

To establish longitudinal alignment, U-shaped brackets 44 are provided on the beam 35 and engage the refractory bricks through an insulator of fireclay 46. The fact that they engage the top of the bricks assures that the bricks will be unable to creep upwardly under pressure. The straight arch thus becomes a manageable component which can be independently designed and transported and which makes it possible to create a roof directly over the surface of the glass melt. By the creation of openings a special cooling can be performed, ahead of the feeder, for example, although, as mentioned above, elements can also be inserted for additional heating, temperature measurement, stirring and the like.

Since the slabs inserted between the straight arches serving as beams are easily replaced and a supporting structure above the tank cover is no longer necessary, repairs, replacements or inspections can be performed without interference.

Since the roof can be prepared on site within a production plant and standardization is thus possible, the solution offered to the above problems can be considered as ideal.

We claim:

1. A roof for an area of a glass melting furnace of refractory material, comprising:
    horizontal supporting elements of refractory material spanning an area of a glass melting furnace at intervals and supported on the glass melting furnace, and bearing the load of the roof; and
    horizontal slabs of refractory material laid transversely between and on said supporting elements and covering said intervals between said supporting elements, in which roof said horizontal supporting elements form arches of straight construction spanning the tank at intervals and bearing the load of the roof, and in which roof said horizontal slabs cover the open intervals between the arches and are laid crosswise between the straight arches, and which includes a frame spanning the arches, which frame comprises a crosspiece and end legs pointing downwardly on both ends, in which lateral abutments are formed on said frame, and which frame includes spring-biased means for gripping the straight arches with lateral, horizontal supporting stress between lateral abutments.

2. A roof according to claim 1, in which said supporting elements and said slabs comprise individual bricks constructed in shape and dimensions as modules of a set or family of brick elements.

3. A roof according to claim 1, in which said supporting elements and said slabs are assembled modularly to form the roof of the furnace while avoiding roof arching and are disposed in a horizontally forming a flat roof with a clear vertical distance from the surface of a melt between 75 mm and 700 mm.

4. A roof according to claim 1, in which said slabs have openings that can be uncovered.

5. A roof according to claim 1, which includes mobile holding means for displaceably holding the slabs.

6. A roof according to claim 1, in which said frame has hoisting eyes on its crosspiece, and in which said frame has side legs and on said side legs has holding pins inserted in bores.

7. A roof according to claim 6, which includes steel channels disposed under said crosspiece having lateral flanges which engage the upper part of the refractory material of the beams.

8. A roof according to claim 7, which includes insulating fire clay disposed between the flanges and the refractory material.

9. The combination comprising:
    a roof for an area of a glass melting furnace of refractory material;
    and a basin having walls forming a tank;
    said roof comprising horizontal supporting elements of refractory material spanning an area of a glass melting furnace at intervals and supported on the glass melting furnace and bearing the load of the roof, and horizontal slabs of refractory material laid transversely between and on said supporting elements and covering said intervals between said supporting elements, said supporting elements being constructed as straight arches lying on said walls of said basin forming said tank and which includes a frame spanning the arches, which frame comprises a crosspiece and end legs pointing downwardly on both ends, in which lateral abutments are formed on said frame, and which frame includes spring-biased means for gripping the straight arches with lateral, horizontal supporting stress between lateral abutments.

10. The combination according to claim 9, which includes a furnace frame having supporting beams with ends having abutments and in which said straight arches are clamped with horizontal end thrust between said abutments.

11. The combination according to claim 10, in which said abutments have means for the adjustment of the horizontal abutment stress.

12. The combination according to claim 9, in which said straight arches have sides having rabbets and in which said slabs are loosely laid on said rabbets.

13. The combination according to claim 12, in which said slabs are displaceable on said rabbets of said straight arches in a direction parallel to the longitudinal axis of said arches.

14. The combination according to claim 9, in which said straight arches include brick elements constructed with stepped supporting surfaces.

15. A roof according to claim 1, in which said lateral abutments of said frame comprise prestressable pressure plates for engagement with the ends of said beams.

16. A roof according to claim 15, in which said legs have said pressure plates and pins fixing said arches in permanent operation.

17. A roof according to claim 15, in which said frame includes, for the thrust against the pressure plates, a hollow cylinder subjected to spring bias and joined to the pressure plates, and a threaded spindle engaging a spring packet disposed between the hollow cylinder and the pressure plate for providing the spring bias.

* * * * *